(12) United States Patent
Takahashi et al.

(10) Patent No.: US 8,575,798 B2
(45) Date of Patent: Nov. 5, 2013

(54) BUS BAR COOLING UNIT FOR STATOR STRUCTURE

(75) Inventors: Hideaki Takahashi, Nagoya (JP); Takaaki Kiyono, Okazaki (JP); Koji Nakanishi, Konan (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 199 days.

(21) Appl. No.: 12/679,993

(22) PCT Filed: Aug. 4, 2008

(86) PCT No.: PCT/JP2008/064376
§ 371 (c)(1),
(2), (4) Date: Mar. 25, 2010

(87) PCT Pub. No.: WO2009/041172
PCT Pub. Date: Apr. 2, 2009

(65) Prior Publication Data
US 2010/0194214 A1    Aug. 5, 2010

(30) Foreign Application Priority Data
Sep. 27, 2007    (JP) .................... 2007-251976

(51) Int. Cl.
*H02K 9/00* (2006.01)
*H02K 9/16* (2006.01)
*H02K 9/19* (2006.01)

(52) U.S. Cl.
USPC ............... 310/54; 310/52; 310/60 A; 310/71

(58) Field of Classification Search
USPC ............... 310/43, 52, 71, 200–208, 214, 260
See application file for complete search history.

(56) References Cited

U.S. PATENT DOCUMENTS

| | | | | |
|---|---|---|---|---|
| 4,959,570 A * | 9/1990 | Nakamura et al. | ............... | 310/54 |
| 6,822,356 B2 * | 11/2004 | Suzuki et al. | ............... | 310/71 |
| 7,514,826 B2 * | 4/2009 | Wakita | ............... | 310/54 |
| 2003/0094879 A1 | 5/2003 | Kobayashi et al. | | |
| 2003/0160523 A1 * | 8/2003 | Suzuki et al. | ............... | 310/43 |
| 2004/0056383 A1 | 3/2004 | Worden et al. | | |
| 2004/0256941 A1 | 12/2004 | Yoneda et al. | | |
| 2005/0108870 A1 | 5/2005 | Harada et al. | | |
| 2005/0151429 A1 * | 7/2005 | Taketsuna et al. | ............... | 310/54 |
| 2006/0174642 A1 | 8/2006 | Nagashima et al. | | |
| 2006/0232143 A1 * | 10/2006 | Purvines et al. | ............... | 310/43 |
| 2007/0278869 A1 * | 12/2007 | Taketsuna | ............... | 310/54 |
| 2010/0275436 A1 * | 11/2010 | Kiyono et al. | ............... | 29/596 |

FOREIGN PATENT DOCUMENTS

| | | |
|---|---|---|
| CN | 1518191 A | 8/2004 |
| JP | 2000-197311 A | 7/2000 |
| JP | 2004-215358 A | 7/2004 |
| JP | 2004215358 * | 7/2004 |

(Continued)

OTHER PUBLICATIONS

Machine translation of JP2004215358, Taketsuna et al., Jul. 2004.*

*Primary Examiner* — Terrance Kenerly
(74) *Attorney, Agent, or Firm* — Kenyon & Kenyon LLP

(57) ABSTRACT

A stator structure comprises an edgewise coil molded with resin with long ends being exposed, a bus bar connected to both ends of the coil ends, and a pump and injection holes for directly cooling the bus bar.

4 Claims, 12 Drawing Sheets

(56) References Cited

FOREIGN PATENT DOCUMENTS

| | | |
|---|---|---|
| JP | 2004-248429 A | 9/2004 |
| JP | 2005-160143 A | 6/2005 |
| JP | 2006-197774 A | 7/2006 |
| JP | 2007-143324 A | 6/2007 |
| WO | 2006/113215 A2 | 10/2006 |

* cited by examiner

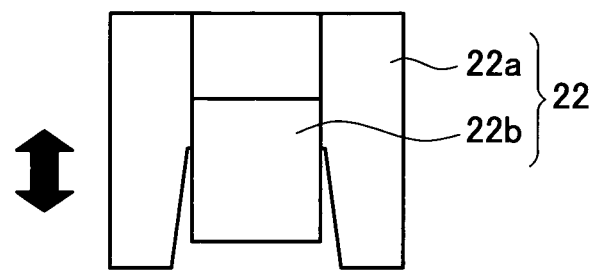
FIG. 5
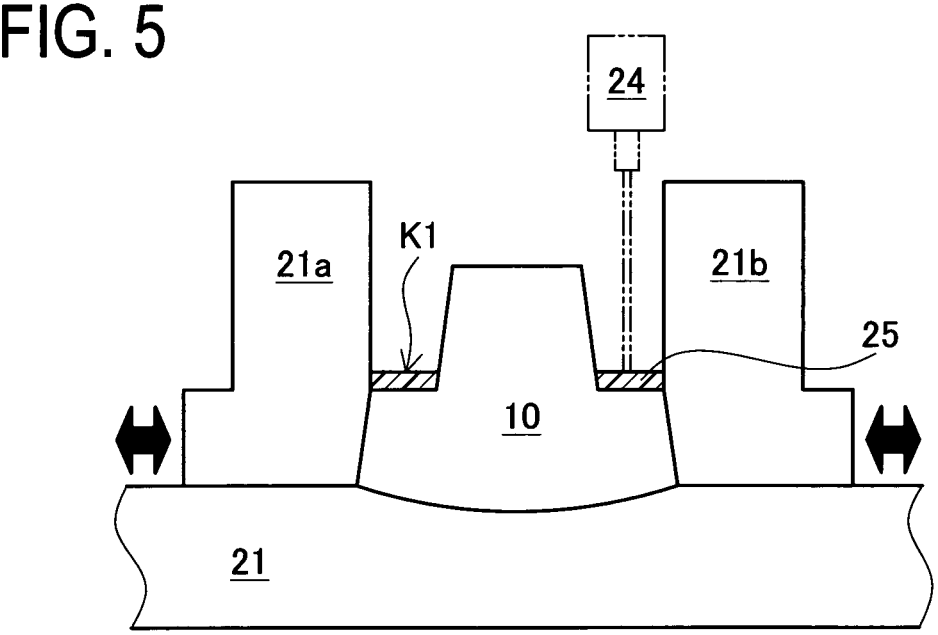

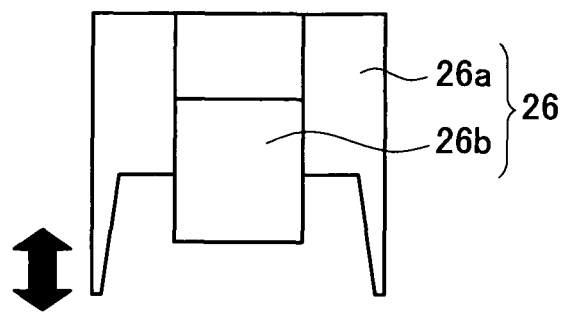
FIG. 6
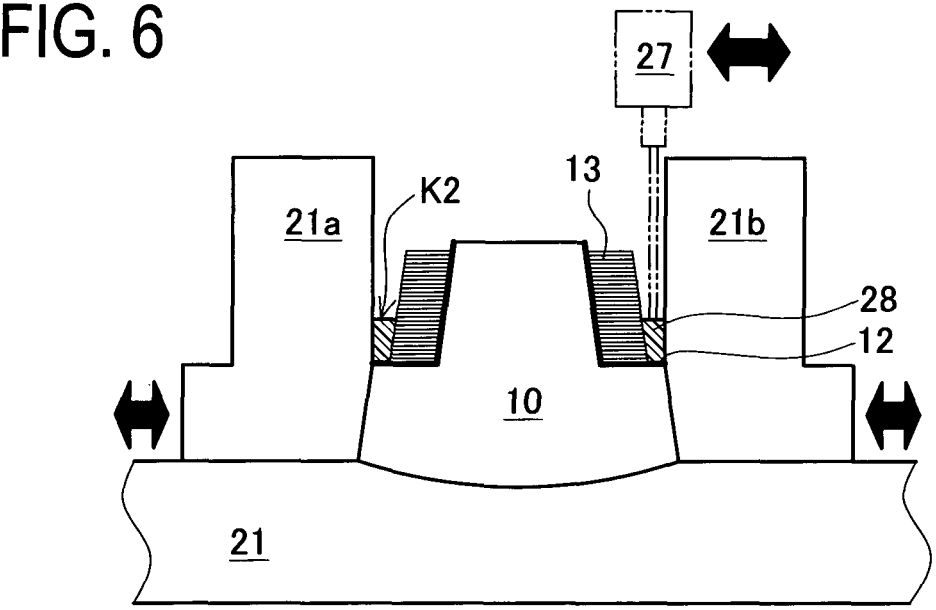

BUS BAR COOLING UNIT FOR STATOR STRUCTURE

This is a 371 national phase application of PCT/JP2008/064376 filed 4 Aug. 2008, claiming priority to Japanese Patent Application No. 2007-251976 filed 27 Sept. 2007, the contents of which are incorporated herein by reference.

FIELD OF THE INVENTION

The present invention relates to a stator structure for a motor and more particularly to a stator structure with a high cooling capability.

BACKGROUND OF THE INVENTION

A motor used in a hybrid electric vehicle outputs high power and has a high space factor of coil for reduction in motor size. This may cause a problem in a temperature rise of the motor coil in use. Accordingly, a demand has been increased for a method of cooling the coil at a high cooling efficiency. When the temperature of the coil rises, a limiter for upper limit temperature is activated for system safety. Consequently, there may occur problems of deterioration in steep-hill climbing capability (gradeability), high-load steady running, and others.

JP2004-215358A discloses a technique of directly cooling by air flow an annular bus bar exposed on a coil with a heat conductive insulating member interposed therebetween.

SUMMARY OF THE INVENTION

Problems to be Solved by the Invention

However, if the technique disclosed in JP2004-215358A is applied to a stator with a coil molded with resin, a resin molded portion will interfere with heat conduction. This technique therefore could not be applied to such a stator.

The present invention has been made to solve the above problems and has a purpose to provide a stator structure with a coil molded with resin and a cooling structure providing low cost and high productivity.

Means for Solving the Problems (1) To achieve the above object, one aspect of the present invention provides a stator structure comprising: a core; a coil mounted on a tooth; a resin molded portion covering the coil; a bus bar connected to the coils; and a cooling unit for directly cooling the bus bar. The coil has both ends protruding out of the resin molded portion, the bus bar connects the protruding ends of the coils, and the cooling unit has a cooling oil injection unit directly injecting the cooling oil toward the bus bar to cool the coil.

(2) In the stator structure (1), preferably, the resin molded portion is formed with an uneven guiding part for guiding and positioning the bus bar.

(3) In the stator structure (2), preferably, the core is constituted of a plurality of split cores, and each of the split cores is attached with the coil and molded with resin.

(4) The stator structure (1), preferably, further comprises a bus bar holder placed on an upper surface of the core located outside the coil to hold at least part of the bus bar, each end of the coil is bent and connected to the bus bar held by the bus bar holder.

An explanation will be given to operations and advantages of the stator structure having the above configuration according to the present invention.

The stator structure of the invention is adapted such that a bus bar is connected to ends of a coil molded with resin so as to expose the ends, and a cooling unit is arranged to directly cool the bus bar.

For example, air or a cooling oil is directly sprayed to the exposed bus bar. Accordingly, the bus bar can be cooled efficiently. On the other hand, the heat generated in the coil covered by the resin molded portion will be conducted to the bus bar because of the high heat conductivity of the coil. The bus bar will heat to a temperature almost equal to the temperature of the coil. Accordingly, direct cooling the bus bar can provide an effect of directly cooling the coil covered by the resin molded portion, thus restraining a temperature increase of the coil. The bus bar is not molded with resin and hence an amount of resin for resin molding can be reduced largely.

Furthermore, the coil (a previously wound cassette coil portion) is resin-molded with its ends serving as terminals exposed and hence the coil portion of each coil can be protected against scratches. This can facilitate a work of wire-connecting the bus bars to the coil ends in later processes and enhance the productivity. Herein, coil terminals to be wire-connected are covered by separate protective caps or the like.

In the stator structure of the invention, the resin molded portion is formed with the uneven part for directing both ends of the bus bar to the coil terminals for wire connection. Accordingly, this makes it easy to attach the bus bars to the resin molded coils and further enhance the productivity.

In the stator structure of the invention, moreover, the split core on which the coil is mounted is molded with resin. It is therefore possible to resin-mold the coil with the coil ends being exposed and achieve a cost reduction.

The stator structure of the invention may be applied to another configuration in which the bus bar holder is placed on the core upper surface located outside the coil to hold at least part of the bus bar, and the coil ends are bent and wire-connected to the bus bar held in the bus bar holder. This configuration does not need the uneven part for guide disclosed in the above configuration (2) and can form a resin molded portion in simpler shape.

BRIEF DESCRIPTION OF DRAWINGS

FIG. 5 is a view showing a structure of a molding die for forming an insulator;

FIG. 6 is a view showing a structure of a molding die for forming a resin molded portion;

BEST MODE FOR CARRYING OUT THE INVENTION

A detailed description of a preferred embodiment of a split core and a manufacturing method thereof for embodying a stator structure of the present invention will now be given referring to the accompanying drawings.

Figure 1:
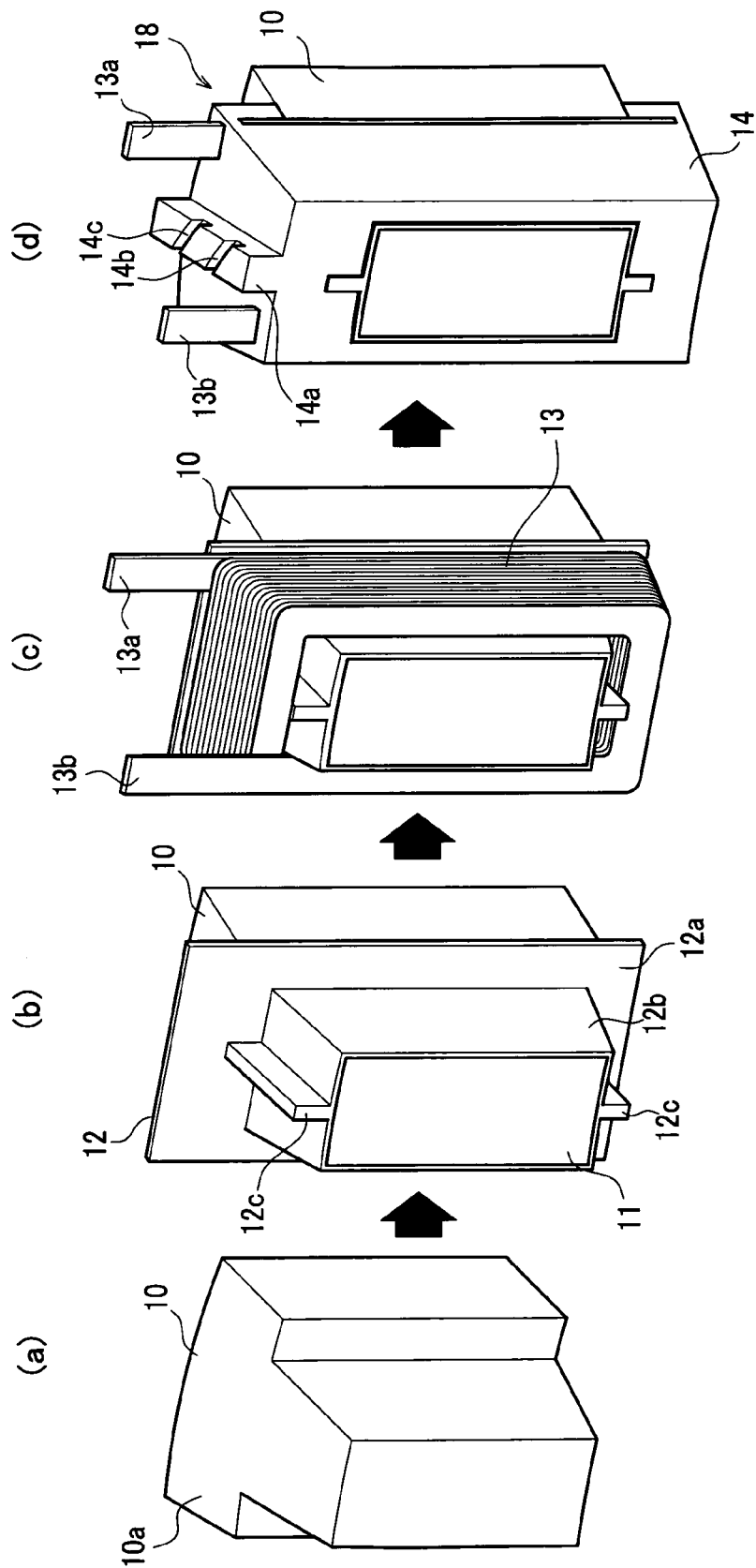
FIG. 1 is a view showing a sequence of manufacturing a split stator in a first embodiment according to the invention.

FIG. 1 shows a sequence of manufacturing a split stator. A split stator core (hereinafter, referred to as a "split core") 10 includes an arc-shaped base portion 10a and a tooth 11 protruding therefrom so that a formed coil is to be mounted around the tooth 11. This split core 10 is made by laminating steel sheets produced by press-punching. Herein, eighteen split cores 10 are to be assembled together to form an annular stator core so that the arc-shaped base portions 10a are circularly arranged with the teeth 11 each protruding radially inwardly. This split core 10 is shown in a state (a) of FIG. 1. In a state (b) of FIG. 1, an insulator 12 is fitted on the tooth 11 of the split core 10. The insulator 12 includes a rectangular sleeve part 12b which covers the tooth 11, a flange 12a which covers an inner surface of the base portion 10a other than the tooth 11 and vertically extends larger than the base portion 10a, and two ribs 12c protruding upward and downward from the sleeve part 12b. In particular, the thickness of each side wall of the insulator 12 is 0.2 mm to 0.3 mm in the embodiment.

A state (c) of FIG. 1 shows that a formed edgewise coil 13 is mounted on the tooth 11 through the sleeve part 12b of the insulator 12. The edgewise coil 13 is made of a coil wire having a flat rectangular cross section and being wound by edgewise bending into a hollow shape with an inner diameter corresponding to the shape of the tooth 11. The edgewise coil 13 is placed in close contact with the split core 10 through the flange 12a. The edgewise coil 13 is positioned in place in a lateral direction by the teeth tooth 11 through the sleeve part 12b and in a vertical direction by the ribs 12c of the insulator 12. Accordingly, the edgewise coil 13 is held in a fixed position relative to the split core 10. The edgewise coil 13 includes a long end 13a extending upward from a position close to the flange 12a and a long end 13b extending upward from a position close to a distal end face of the teeth tooth 11. The long ends 13a and 13b serve as coil terminals.

In the present embodiment, the edgewise coil 13 is a formed coil. However, other types of coils having for example circular section, rectangular section, or others, may be adopted if only a coil has a completely formed shape.

A state (d) of FIG. 1 shows a split stator 18 molded with resin. In this figure, the edgewise coil 13 is coated with a resin molded portion (layer) 14. A resin molding technique thereof will be mentioned in detail later. The pair of long ends 13a and 13b protrudes out of the resin molded portion 14 of the split stator 18. The resin molded portion 14 is formed with a guide rib 14a protruding upward from the upper surface. The guide rib 14a is formed with two grooves 14b and 14c. These guide rib 14a and grooves 14b and 14c correspond to an uneven part for guide of the invention.

Figure 3:
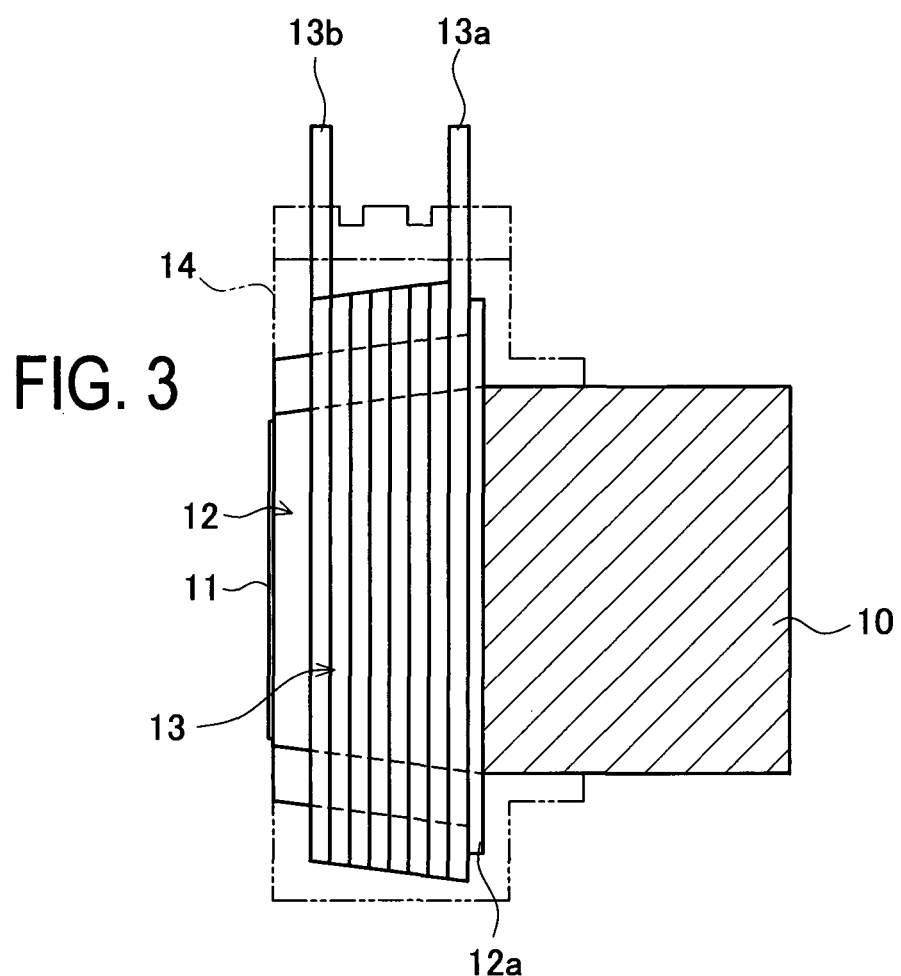
FIG. 3 is a sectional view of the split stator.

FIG. 3 is a sectional view of the resin-molded split stator 18, showing a positional relationship between the edgewise coil 13 and the resin molded portion 14.

The edgewise coil 13 is mounted on the split core 10 with the insulator 12 interposed therebetween, and then the resin molded portion 14 is formed to coat only a winding portion (a previously wound cassette coil portion) of the edgewise coil 13.

Figure 2:
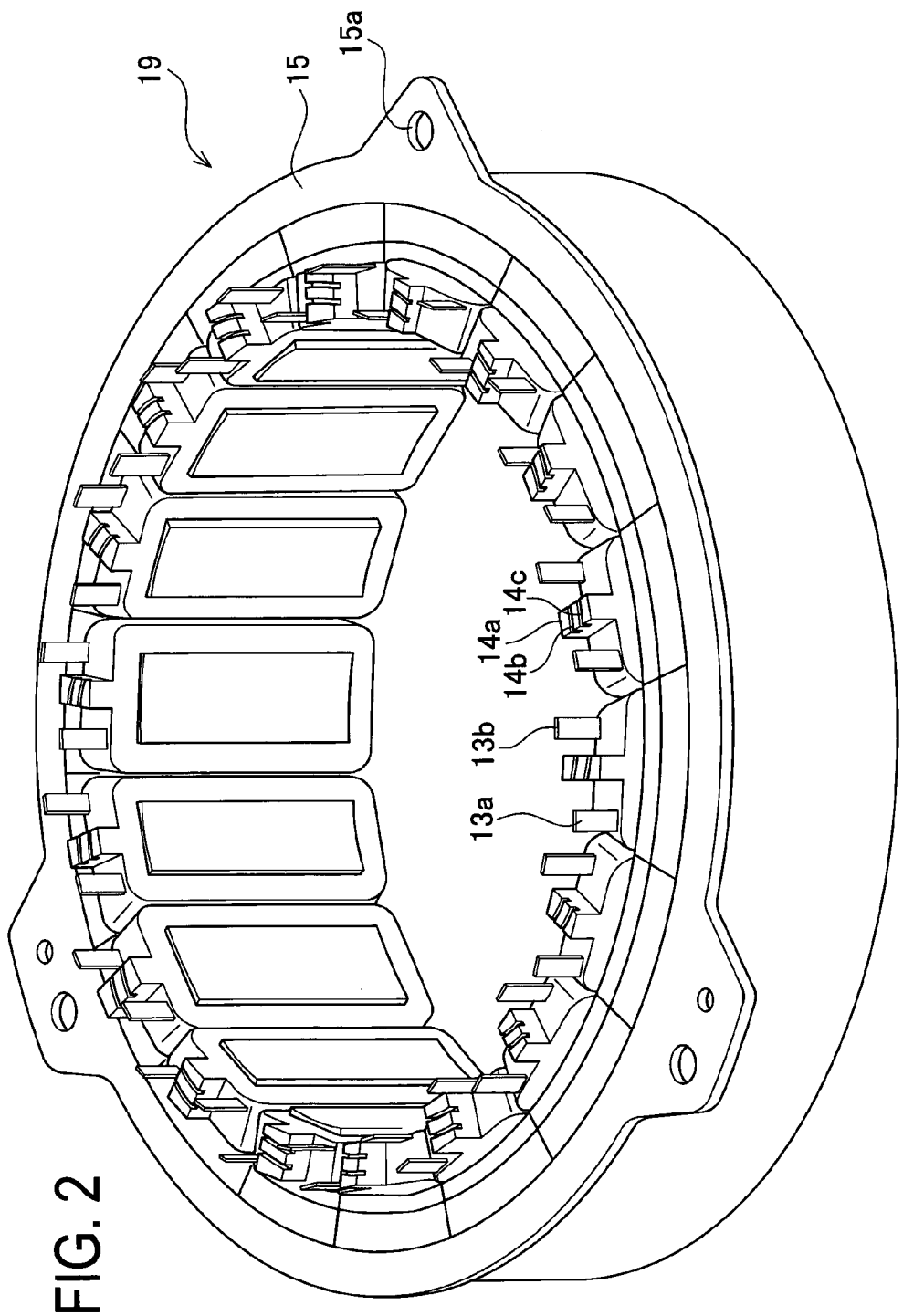
FIG. 2 is a view showing a stator constituted of eighteen split stators of FIG. 1 and fitted in an outer ring by shrink fitting.

FIG. 2 shows a stator 19 in which the eighteen split stators 18 are assembled together. Specifically, the eighteen split stators 18 are assembled in annular form, and an outer ring 15 heated and expanded in inner diameter is set around the split stators 18. Then, this assembly is cooled to a normal temperature, causing the outer ring 15 to shrink, decreasing its inner diameter. The eighteen split stators 18 are then constricted integrally to form the stator 19. This technique is a so-called shrink fitting of an outer ring.

Figure 4:
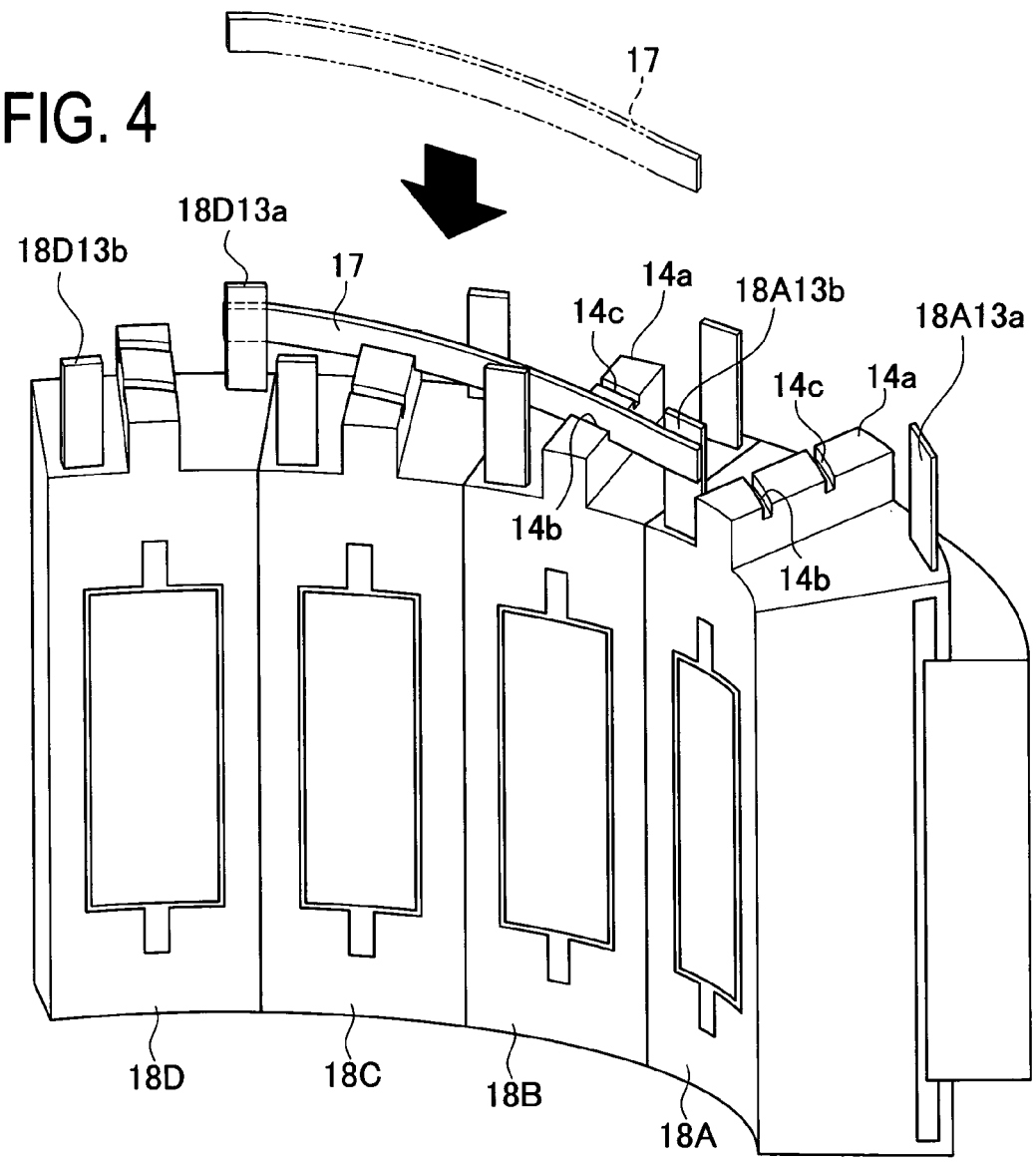
FIG. 4 is a view showing a state of wire connection in the stator using a bus bar.

In a next step, as shown in FIG. 4, the bus bar 17 is set to connect a long end 18D13a of one split stator 18D with a long end 18A13b of a third split stator 18A by skipping two split stators 18C and 18B to the right. The long ends 13a and 13b of the eighteen split stators 18 are appropriately connected in this way through the bus bars 17 to constitute a motor coil with three U, V, and W phases.

Herein, the bus bar 17 is Tig-welded to the long ends 18D13a and 18A13b respectively while it is engaged in the groove 14c of the guide rib 14a of the split stator 18C and the groove 14b of the guide rib 14a of the split stator 18B.

A method of manufacturing the split stator 18 will be explained below. FIG. 5 shows a structure of a molding die for forming the insulator 12. FIG. 6 shows a structure of a molding die for forming the resin molded portion 14. For easy viewing, those figures are not applied with hatching lines indicating sections.

As shown in FIG. 5, the split core 10 is held by a lower die 21 in four side directions (only two of them are shown), using an appropriate slide core selected from various slide cores configured to hold a workpiece in two, three, or four sides directions. In this figure, specifically, the core 10 is fixedly held between a pair of lower slide cores 21a and 21b. From this state, an upper die 22 is moved down. This upper die 22 includes a guide core 22a and a leading slide core 22b which is guided by the guide core 22a to vertically slide. The slide core 22b is urged downward by a spring or the like. A supply device 24 is disposed between the upper die 22 and the lower die 21 so as to be movable to a standby position.

An insulator forming process is explained below.

(1) In a state where the lower slide cores 21a and 21b are opened by moving apart from each other, the split core 10 is loaded therebetween. The slide cores 21a and 21b are then closed by moving toward each other to hold the split core 10 in place from either side thereof. The split core 10 has been heated in advance.

(2) The upper die 22 stays in an open position and the supply device 24 is moved once around the teeth 11 to supply a required amount of a high heat-conductive material such as epoxy resin as an insulator material 25 into a cavity K1. FIG. 5 shows a state after the insulator material 25 is supplied. After resin supply, the supply device 24 is moved to its standby position.

(3) The upper die 22 is then moved downward until the leading slide core 22b comes into contact with a distal end face of the teeth 11. In this state, the split stator 10, the lower slide cores 21a and 21b, the guide core 22a, and the leading slide core 22b define the cavity K1.

(4) Subsequently, the guide core 22a is further moved downward, providing a cavity for forming the insulator 12. The insulator material 25 is molded into the insulator 12 as shown in FIG. 1(b).

(5) After the insulator material 25 is solidified, the upper die 22 is moved upward.

Next, a structure of a molding die for resin molding the edgewise coil 13 will be explained below. As shown in FIG. 6, the lower die 21 and the lower slide cores 21a and 21b are the same in structure as those in FIG. 5. A guide core 26a of an upper die 26 is the same as the guide core 22a in FIG. 5. A leading slide core 26b which is guided by the guide core 26a to vertically slide has a lower surface for forming a cavity of different shape from the slide core 22b in FIG. 5. The slide core 26b is also urged downward by a spring or the like. A supply device 27 is disposed between the lower die 21 and the upper die 26 so as to be movable to a standby position.

Figure 7:
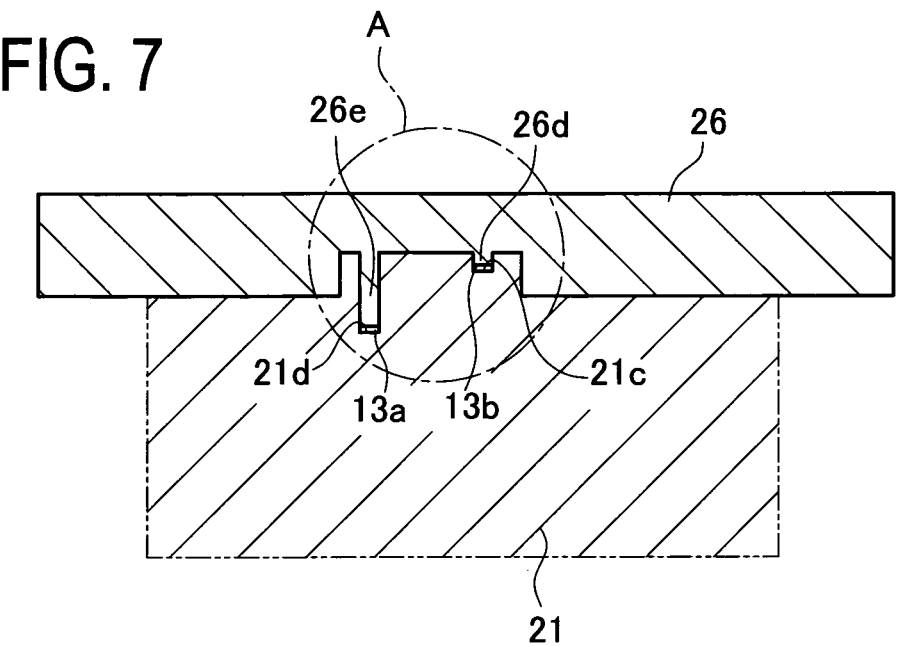
FIG. 7 is s a sectional view showing a shielding structure of long ends.

In the resin molding process for molding the coil 13 with resin, molding is performed after the edgewise coil 13 is set in a cavity K2. Accordingly, the long ends 13a and 13b of the edgewise coil 13 have to be shielded in an appropriate manner. A shielding structure is shown in FIG. 7. In this embodiment, in order to allow automatic setting of the edgewise coil 13 in the resin molding die, the molding die is designed to shield over the long ends 13a and 13b serving as coil terminals up to respective proximal portions.

The lower die 21 is formed with a deep groove 21d at a position to receive the long end 13a of the edgewise coil 13 extending from the cavity of the lower die 21. Correspondingly, the upper die 26 is formed with a long protrusion 26e. Those deep groove 21d and long protrusion 26e shield the periphery of the long end 13a.

The lower die 21 is further formed with a shallow groove 21c at a position to receive the long end 13b extending from the cavity. The upper die 26 is correspondingly formed with a short protrusion 26d. Those shallow groove 21c and short protrusion 26d shield the periphery of the long end 13b. For preventing damage to a surface layer of the coil, the dies are provided, on contact surfaces, with a cushioning member such as elastomer as needed.

Figure 8:
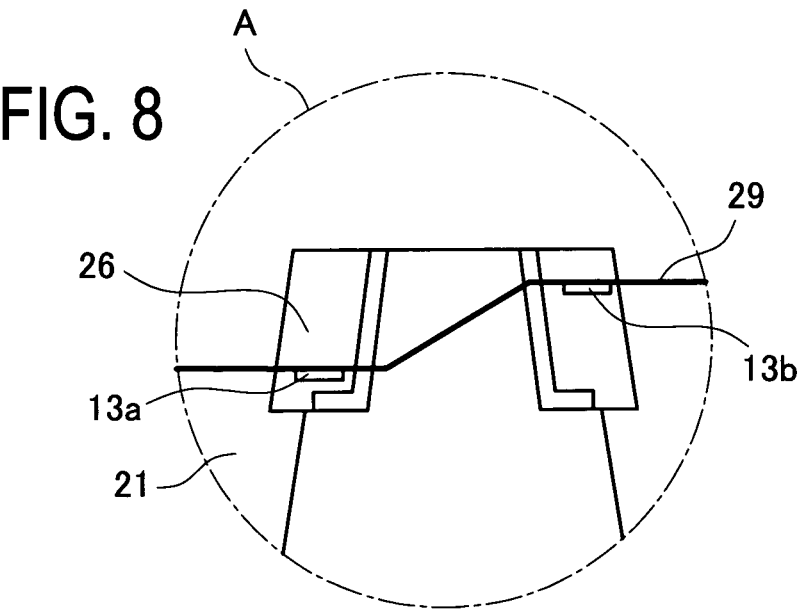
FIG. 8 is a sectional view showing another shielding structure of long ends.

FIG. 8 shows another shielding structure, corresponding to only a circled portion A indicated with a dashed line in FIG. 7. In this method, a parting line 29 between the upper die 26 and the lower die 21 is defined as an inclined (stepped) plane, not a flat plane, between the long ends 13a and 13b existing at different levels in section. Accordingly, this method enables shielding of the periphery of each long end 13a, 13b without forming the long protrusion 26e.

The coil resin-molding process is explained below.

(1) In a state where the lower slide cores 21a and 21b are opened by moving apart from each other, the split core 10 with the molded insulator 12 is loaded therebetween. The slide cores 21a and 21b are then closed by moving toward each other to hold the split core 10 from either side thereof. The split core 10 has been heated in advance. In this state, the formed edgewise coil 13 is inserted in the lower die 21 and set on the core 10.

(2) The upper die 26 stays in an open position and the supply device 27 is moved once around the teeth 11 (the coil 13) to supply a required amount of a resin molding material 28 forming the resin molded portion 14 into the cavity K2. FIG. 6 shows a state where the resin molding material 28 has been supplied. After resin supply, the supply device 27 is moved to its standby position.

(3) The upper die 26 is moved downward until the leading slide core 26b comes into contact with the distal end face of the teeth 11. In this state, the split core 10, the lower slide cores 21a and 21b, the guide core 26a, and the leading slide core 26b define the cavity K2.

(4) Subsequently, the guide core 26a of the upper die 26 is further moved downward, providing a cavity for forming the resin molded portion 14. The cavity K2 includes the edgewise coil 13 and is larger than the cavity K1. The resin molding material 28 is supplied in the cavity K2 and molded into the shape of the resin molded portion 14 as shown in FIG. 1 (d).

(5) After the resin molding material 28 is solidified and then the upper die 26 is moved upward.

Figure 9:
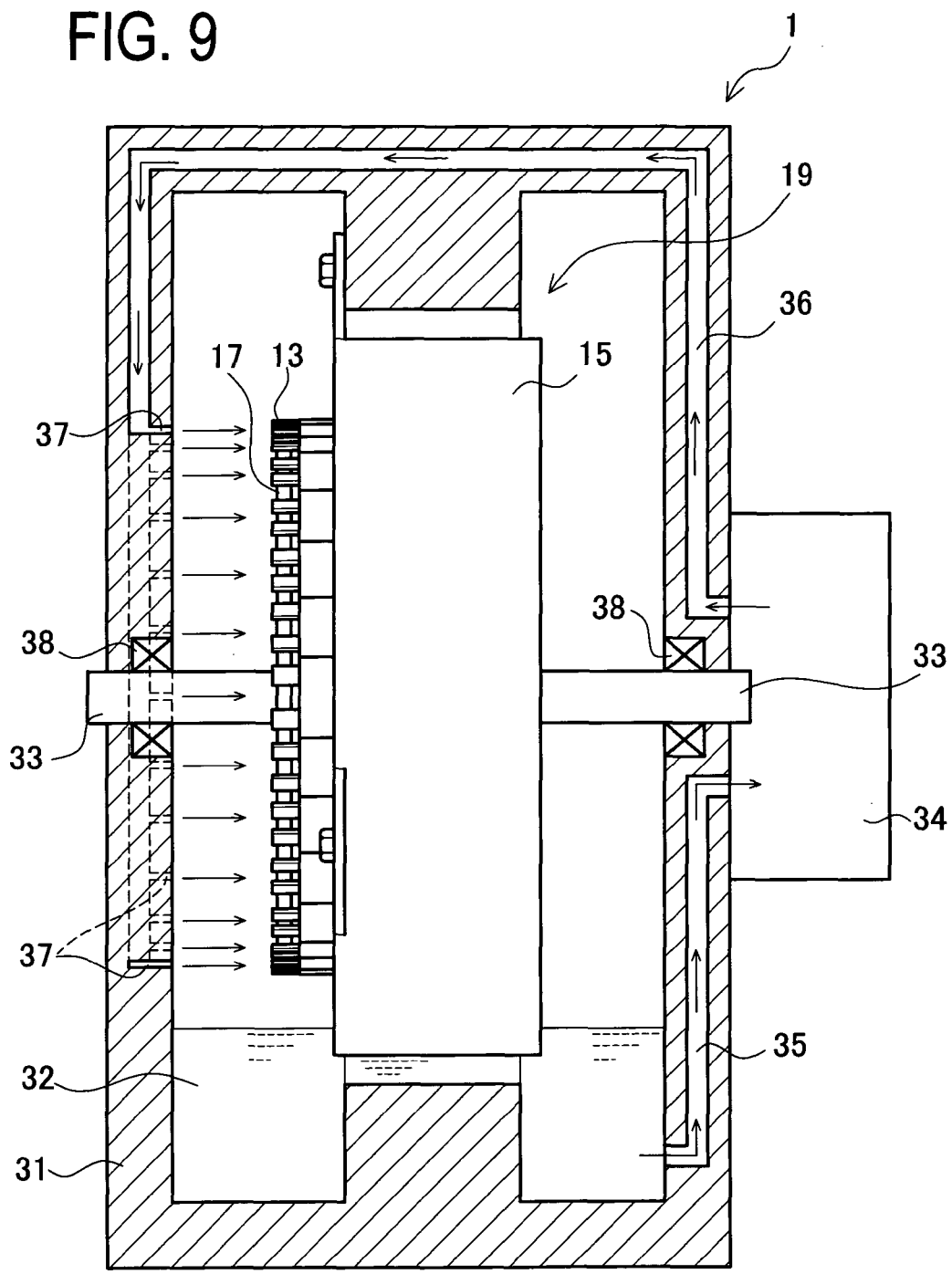
FIG. 9 is a view showing a stator structure of the first embodiment according to the present invention.

The following explanation is given to the stator structure of the present embodiment. FIG. 9 shows this stator structure 1. The stator 19 is secured to a casing 31 providing a sealed space by a bolt inserted in a mounting hole 15a of the outer ring 15. The casing 31 holds a rotor shaft 33 rotatably through a bearing 38. The casing 31 holds a predetermined amount of cooling oil 32.

The casing 31 is formed with a feed passage 35 for feeding the cooling oil 32 to a pump 34 and an output passage 36 for outputting the cooling oil 32 from the pump 34. The output passage 36 communicates with a plurality of injection holes 37 circularly arranged to face the long ends 13a and 13b and the bus bars 17. The cooling oil 32 is thus directly injected through the injection holes 37 toward the long ends 13a and 13b and the bus bars 17 to directly cool them. The cooling oil 32 will drop down into a cooling-oil reservoir.

Figure 10:
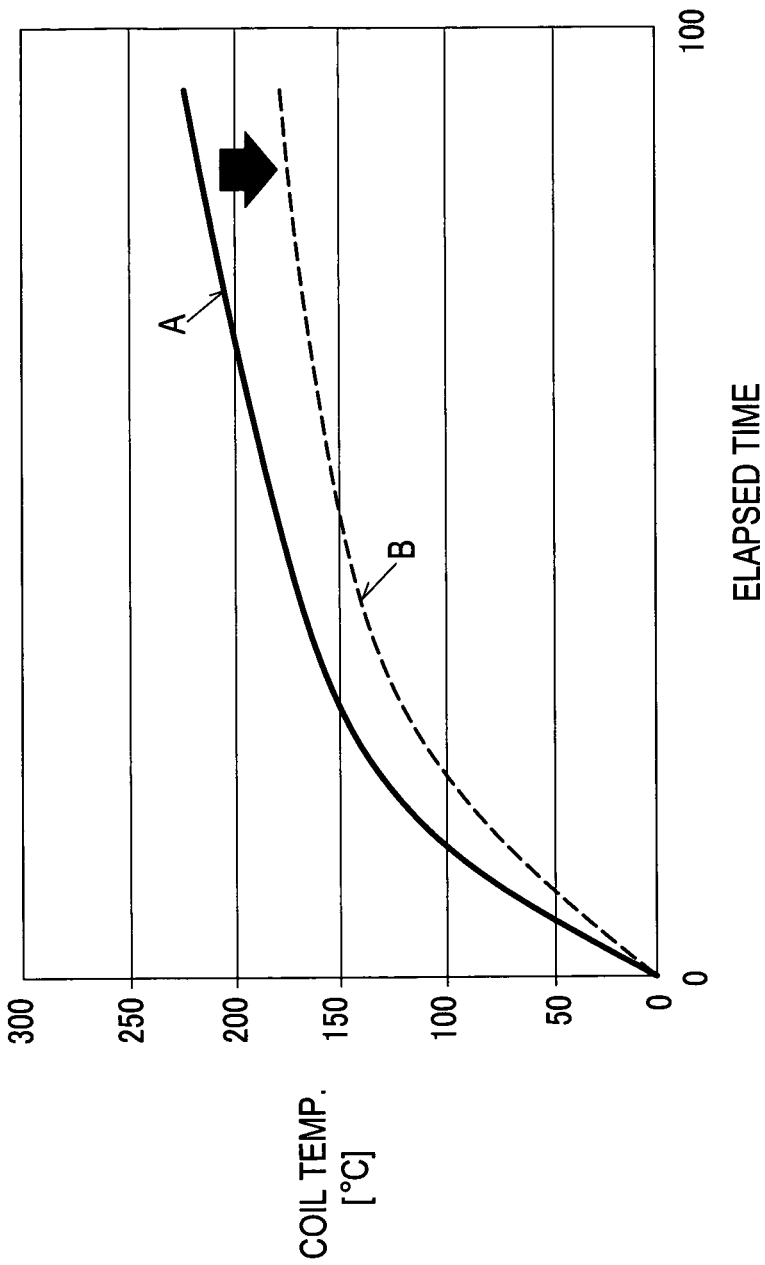
FIG. 10 is a graph showing effects of the stator structure of the first embodiment.

FIG. 10 is a graph showing the effects resulting from the use of the stator structure 1 of the present embodiment as shown in FIG. 9. In the graph, a vertical axis indicates the temperature of the edgewise coil 13 and a lateral axis indicates the elapsed time of activation of the motor at constant voltage and current.

Figure 13:
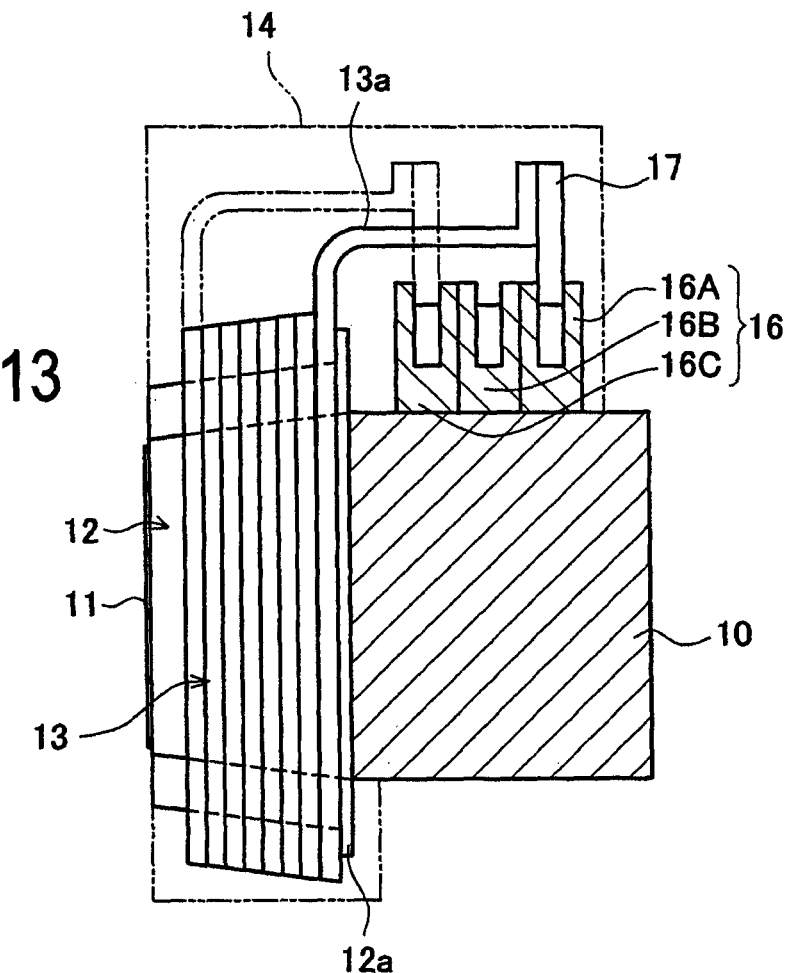
FIG. 13 is a sectional view of a conventional stator.

In the graph, a line A represents the result of a cooling test on a conventional stator of FIG. 13 with the cooling structure of FIG. 9 and a line B represents the result of a cooling test on the stator 18 of the present embodiment. The graph of FIG. 10 reveals that the present embodiment could provide so larger cooling effect of preventing a temperature increase of several tens of degrees under the same condition of a hill-climbing pattern.

As described in detail above, according to the stator structure 1 of the present embodiment, the bus bars 17 are connected to the long ends 13a and 13b of the coils 13 each molded with resin with the long ends 13a and 13b extending so as not to be covered with resin. The stator structure 1 further includes the pump 34 and the injection holes 37 for directly cooling the bus bars 17. Accordingly, the cooling oil 32 is directly sprayed to the exposed bus bars 17, thereby efficiently cooling the bus bars 17. On the other hand, the heat generated in each coil 13 covered with the resin molded portion 14 is conducted to the bus bars 17 because of high heat conductivity of the coils 13 and hence the bus bars 17 heat to a temperature almost equal to the temperature of the coils 13. Each coil 13 is made of copper, which has heat conductivity as high as 400 W/mK. Accordingly, it can be cooled at extremely higher cooling efficiency than the resin molded portion having heat conductivity of the order of 0.2 to 2 W/mK.

By directly cooling the bus bars 17 as above, the coils 13 covered by the resin molded portions 14 can be directly cooled. Thus, the temperature increase of each coil 13 can be restrained.

Herein, the cooling oil 32 is used as a cooling medium. Alternatively, not only liquid but also air, gas, or the like may be adopted. The bus bars 17 are not covered with resin molding and therefore the amount of resin needed for molding can be reduced largely.

Furthermore, each coil 13 is molded with resin so that the coil ends 13a and 13b are exposed. The winding portion (the previously wound cassette coil portion) of each coil 13 can therefore be protected against scratches. This can facilitate a work of wire-connecting the bus bars 17 to the coil ends 13a and 13b in later processes and enhance the productivity. Herein, coil terminals to be wire-connected are covered by separate protective caps or the like.

According to the stator structure 1 of this embodiment, the uneven part for guide (the guide rib 14a, the grooves 14b and 14c) are formed in each resin molded portion 14 to direct both ends of the bus bar 17 toward the relevant long ends 13a and 13b respectively for wire connection. This makes it easy to attach the bus bars 17 to the resin molded coils 13 and further enhance the productivity.

In the stator structure of the present embodiment, the stator is constituted of a plurality of split cores divided per teeth and each split core is molded with resin. It is therefore easy to resin-mold the coil 13 with the ends 13a and 13b being exposed and achieve a cost reduction. The stator may be constituted of split cores each having one or more teeth.

According to the split stator 18 of this embodiment, the formed coil 13 is fitted on the teeth 11 of the split core 10 with the insulator 12 interposed therebetween and the coil 13 is molded with resin, forming the resin molded portion 14 so that the long ends 13a and 13b remain exposed. An insulation performance of the coil 13 can be ensured.

Only the space for the winding portion of the coil 13 can be filled with resin by resin molding. It is thus possible to reduce the amount of resin needed for resin molding. Conventionally, bus bars do not need to be molded with resin if only they are arranged at sufficient intervals to provide insulation. If the above configuration is to be resin-molded by a conventional technique, all the stator cores 10, particularly, all eighteen winding portions have to be placed simultaneously in contact with a molding die to form a molding cavity. Thus, thirty-six coil terminals need to be shielded or protected from the resin molding. This requires a molding die of a complicated shape which is technically difficult to produce.

The split stators 18 of the present embodiment can be manufactured by individually molding eighteen winding portions with resin while sealing only two coil terminals of each coil. It is therefore possible to mold resin in only the space for each coil winding portion and hence cut down more than 40% of an amount of resin required for the resin molding.

As a comparison, FIG. 13 is a sectional view showing a conventional resin molding configuration. In the conventional configuration, a resin molded portion 14 is formed not only in the space for a winding portion of the coil 13 but also over the bus bars together. It is found from the comparison between the configurations in FIGS. 13 and 3 that the present embodiment could achieve a 40% reduction of resin molding material.

Meanwhile, the molding cavity in one resin molding is small in volume, so that resin of low fluidity can be used as it is. A motor for hybrid electric vehicle needing high torque will be supplied with relatively high voltage, thus generating a large amount of heat. Accordingly, the resin molded portion is required to have higher heat conductivity. For this end, an additive is added to the resin. This may decrease the resin fluidity, causing a technical difficulty in filling the resin in the molding cavity in every corner, particularly, in internal space (clearances) in a winding portion of the coil.

According to the split stator of the present embodiment, the volume of the molding cavity is so small as to allow the resin to be filled throughout the internal space in the winding portion of the coil 13. This makes it possible to increase the efficiency of releasing heat generated in the coil 13 to the outside through the resin molded portion 14.

Furthermore, only two terminals of each coil have only to be shielded. As compared with the case where the stator cores are entirely resin-molded at the same time, accordingly, the molding die can be designed more easily, leading to a reduction in molding die cost.

The insulator 12 is integrally formed on the split core 10 by resin molding. That is, after the insulator 12 is molded from resin on the split core 10, the formed coil is inserted in the die and then molded with resin. By such a series of processes after the split stator core 10 is loaded in the lower molding die 21, the split stator 18 can be manufactured consecutively.

Figure 11:
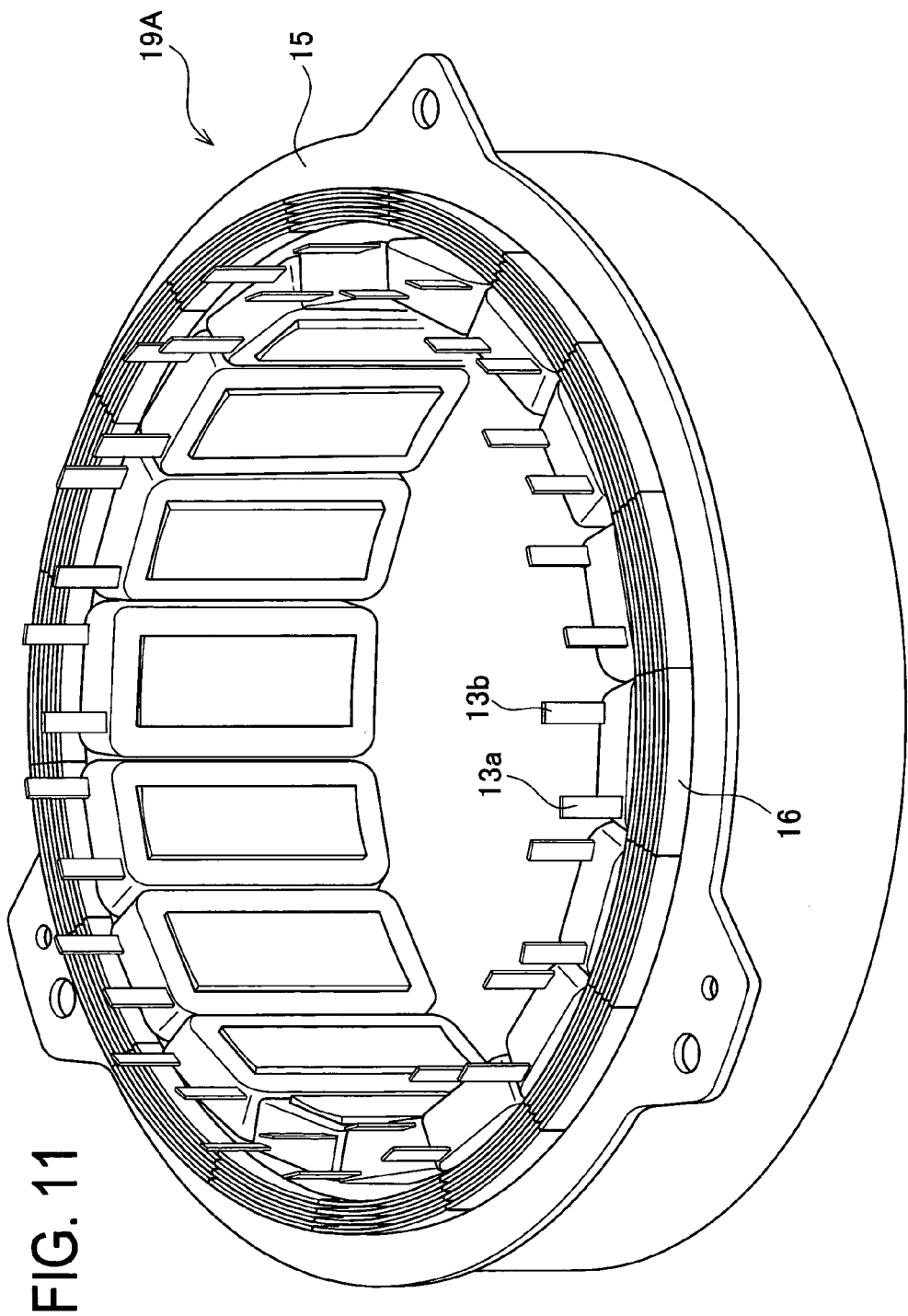
FIG. 11 a view showing a second embodiment of a stator constituted of eighteen split stators and fitted in an outer ring by shrink fitting.
Figure 12:
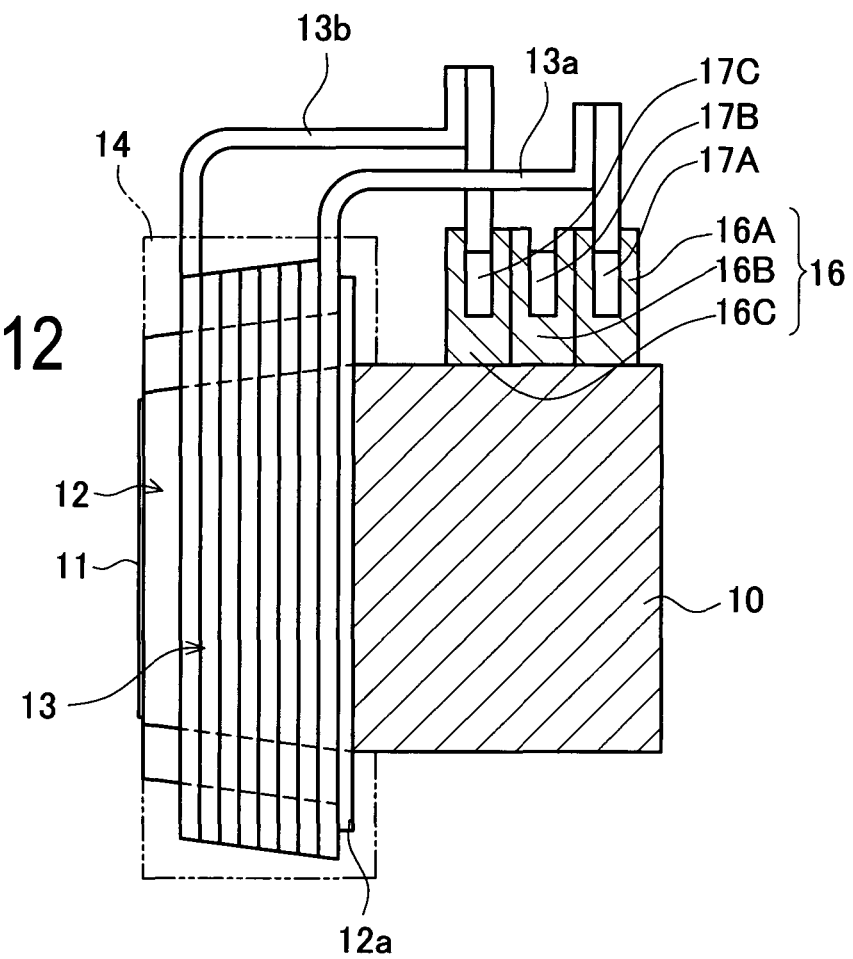
FIG. 12 is a sectional view of the split stator of the second embodiment.

A second embodiment of the present invention will be described below. The second embodiment is substantially identical in structure to the first embodiment and the identical or similar components are given the same reference signs and their explanations will be omitted. The following explanation is thus focused on the differences from the first embodiment. FIG. 11 shows a stator 19A in which the eighteen split stators 18 of FIG. 12 are assembled together. FIG. 12 is a sectional view of the split stator 18.

The eighteen split stators 18 are assembled in annular form, and the outer ring 15 heated and expanded in inner diameter is set around the split stators 18. Then, this assembly is cooled to a normal temperature, causing the outer ring 15 to shrink, decreasing its inner diameter. The eighteen split stators 18 are then constricted integrally to form the stator 19A. This technique is a so-called shrink fitting of an outer ring.

In a next step, not shown, the long end 13a of one split stator 18 is connected with the long end 13b of a third split stator 18 by skipping two split stators 18 to the left by means of the bus bar 17 (17A, 17B, or 17C) in the holder 16 (16A, 16B, or 16C). The long ends 13a and 13b of the eighteen split stators 18 are appropriately connected in this way through the bus bars 17 (17A, 17B, 17C) in the holders 16 (16A, 16B, 16C) to constitute a motor coil with three U, V, and W phases.

The stator structure of the second embodiment is constituted merely by replacing the stator 19 shown in FIG. 9 with the stator 19A of FIG. 11. Accordingly, the details thereof will not be repeated herein.

According to the stator structure of the second embodiment, the bus bar holder 16 holding at least part of the bus bar 17 is placed on the base portion 10a of the core 10 located outside the coil 13, and the long ends 13a and 13b of each coil 13 are bent to be connected to the bus bars 17 held in the holder 16. Thus, this embodiment does not need the uneven part for guide (the guide rib 14a, the grooves 14b and 14c) of the first embodiment, thereby enabling easier resin molding.

The present invention is not limited to the above embodiments and may be embodied in other specific forms without departing from the essential characteristics thereof.

In the above embodiment, the cooling oil 32 is used to cool the coils 13 but an air cooling technique may be adopted instead.

In the above embodiment, the explanation is given to the split stator 18 including a single edgewise coil 13. As an alternative, a split core having two teeth 11 may be adopted, in which two edgewise cores 13 are mounted on the teeth respectively, and all the split cores are assembled and entirely resin-molded.

Another alternative is to employ a split stator core having three teeth 11 on which three edgewise coils 13 are mounted individually, and the split stator cores are assembled and entirely resin-molded.

As explained in the above embodiments, the present invention may be applied to any coil made of a coil wire having a circular, square, or different-shaped section as well as the edgewise coil if only it is finished as a formed coil.

While the presently preferred embodiment of the present invention has been shown and described, it is to be understood that this disclosure is for the purpose of illustration and that various changes and modifications may be made without departing from the scope of the invention as set forth in the appended claims.

The invention claimed is:

1. A stator structure comprising:
   a core;
   a coil mounted on a tooth of said core;
   a resin molded portion covering the coil, wherein the coil has both ends protruding out of the resin molded portion;
   a bus bar directly connected to a protruding end of the coil; and
   a cooling unit for directly cooling the bus bar, wherein the cooling unit has a cooling oil injection unit having multiple circularly-arranged injection holes that inject the cooling oil toward the direct connection point of the bus bar and the coil.

2. The stator structure according to claim 1, wherein the resin molded portion is formed with an uneven guiding part for guiding and positioning the bus bar.

3. The stator structure according to claim 2, wherein the core is constituted of a plurality of split cores, and each of the split cores is attached with the coil and molded with resin.

4. The stator structure according to claim 1 further comprising a bus bar holder placed on an upper surface of the core located outside the coil to hold at least part of the bus bar, each end of the coil is bent and connected to the bus bar held by the bus bar holder.

* * * * *

UNITED STATES PATENT AND TRADEMARK OFFICE
CERTIFICATE OF CORRECTION

PATENT NO. : 8,575,798 B2
APPLICATION NO. : 12/679993
DATED : November 5, 2013
INVENTOR(S) : Takahashi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 234 days.

Signed and Sealed this
Twenty-second Day of September, 2015

Michelle K. Lee
*Director of the United States Patent and Trademark Office*